United States Patent [19]
Reinicke

[11] Patent Number: 5,464,041
[45] Date of Patent: Nov. 7, 1995

[54] MAGNETICALLY LATCHED MULTI-VALVE SYSTEM

[75] Inventor: Robert H. Reinicke, Mission Viejo, Calif.

[73] Assignee: Marotta Scientific Controls, Inc., Montville, N.J.

[21] Appl. No.: 194,836

[22] Filed: Feb. 14, 1994

[51] Int. Cl.⁶ .............................. F16K 11/00; F16K 31/08
[52] U.S. Cl. .............................. 137/595; 137/315; 251/65; 251/129.15; 251/367
[58] Field of Search .................................. 137/595, 315; 251/65, 129.15, 367

[56] References Cited

U.S. PATENT DOCUMENTS

| | | | |
|---|---|---|---|
| 3,064,936 | 11/1962 | Strauss | 251/367 X |
| 3,073,341 | 1/1963 | Schernekan | 251/367 X |
| 3,443,585 | 5/1969 | Reinicke | 137/595 |
| 3,472,277 | 10/1969 | Reinicke | 137/595 |
| 3,495,604 | 2/1970 | Trask | 137/15 |
| 3,534,757 | 10/1970 | Doherty | 137/15 |
| 3,661,178 | 5/1972 | Wichmann | 137/595 |
| 3,814,376 | 6/1974 | Reinicke | 251/65 |
| 4,223,698 | 9/1980 | Reinicke | 137/595 |
| 4,403,765 | 9/1983 | Fisher | 251/65 |
| 4,543,991 | 10/1985 | Fuchs | 137/595 |
| 5,269,490 | 12/1993 | Fujikawa et al. | 137/884 X |

FOREIGN PATENT DOCUMENTS 892097 12/1981 U.S.S.R. .............................. 137/595

*Primary Examiner*—Stephen M. Hepperle
*Attorney, Agent, or Firm*—Hopgood, Calimafde, Kalil & Judlowe

[57] ABSTRACT

A multiple-valve system is transiently electromagnetically actuated by a single electrical winding, for concurrent change of state for each of the multiple valves, and a permanently magnetized portion of involved magnetic circuitry serves to latch both valves in the operative state into which they have been actuated. The preferred embodiment is based on valve-body structure which is a unitary consolidation of plural slabs of magnetic material in alternation with slabs of non-magnetic material. An electromagnetic actuator includes a U-shaped core having pole faces secured to the uppermost slab, in confronting relation with valve members of magnetic material. A first polarized magnetic-latch circuit exists via the U-shaped core, together with the valve members and a magnetized body slab when in valve-open condition. A second polarized magnetic-latch circuit exists via the magnetized slab, the valve members and another magnetic slab, when the system is in valve-closed condition. And momentary electrical excitation of the electromagnet will shift the system from valve-open to valve-closed condition, or vice versa, depending upon the sign of the electrical excitation.

20 Claims, 3 Drawing Sheets

5,464,041

MAGNETICALLY LATCHED MULTI-VALVE SYSTEM

BACKGROUND OF THE INVENTION

The invention relates to an electromagnetically operated valve construction wherein permanent-magnet action is effective to latch, i.e., to retain, a selected open or closed condition of at least two valves, each of which is operative to control a different and independent flow of pressure fluid.

U.S. Pat. Nos. 3,443,585, 3,472,277, and 4,223,698 describe magnetically linked dual-valve systems wherein a single electromagnetic excitation is operative to drive each of two valve members, each of which serves its own separate pressure-fluid flow. In U.S. Pat. No. 3,443,585, a permanent magnet is the common middle leg of two separate solenoid-actuated magnetic circuits. Excitation of one solenoid opens both valves; excitation of the other solenoid closes both valves, and the permanent magnet holds the actuated condition of both valves. U.S. Pat. Nos. 3,472,277 and 4,223,698 each disclose an electromagnetic actuating system wherein a single solenoid coil actuates two magnetically linked valves to open condition, against the preloaded compliant action of springs to load valve members in the valve-closing direction. In all cases, construction of a final product is highly specialized and complex, leading to unduly expensive products.

Copending application Ser. No. 08/184,484, filed Jan. 19, 1994 describes a magnetically latched valve construction wherein electrical excitation of a single winding is required only for effecting a change of state of a single valve, from open to closed position and vice versa, depending upon the polarity of excitation of a single winding. Magnetic latching to retain one or the other of these states is achieved solely by a permanently magnetized portion of the magnetic circuitry; the disclosure of said copending application is hereby incorporated by reference.

BRIEF STATEMENT OF THE INVENTION

It is an object of the invention to provide an improved electromagnetically actuated and magnetically latched multiple-valve system overcoming disadvantages of prior constructions.

A specific object is to meet the above object with a novel valve-body construction and method of making the same, lending itself to greater precision in the final product, and requiring materially less manufacture of subassemblies that must be assembled to each other.

Another specific object is to provide enhanced features of safety in a multiple-valve system wherein separate fluid flows to be handled by the respective component valves are inherently dangerously reactive with each other but are assuredly retained as independent unreacted flows in their passage through, or controlled stoppage by, the valve system.

A general object is to achieve simplicity and relatively low cost, in addition to enhanced safety, in an electromagnetically actuated multiple-valve system of the character indicated.

The invention in its presently preferred form achieves the foregoing objects by relying upon a valve-body construction wherein relatively thick non-magnetic and magnetic slabs are bonded into a consolidated body block, in laminated alternation, prior to machining the same to serve the dual-valve purposes of the invention. The first and lowermost slab is of magnetic material; the second and next-adjacent slab is of non-magnetic material; the third and next-adjacent slab is of magnetic material; and the fourth and uppermost slab is of non-magnetic material. After bodyblock consolidation, the second, third and fourth slabs are configured with two spaced upstanding and upwardly open guide bores on axes defining an upstanding vertical plane of symmetry, and the first and second slabs are configured on each of said axes with a downwardly open valve-chamber wall communicating with one to the exclusion of the other of the guide bores. The second slab has independent pressure-fluid inlet passages, each of which communicates with one to the exclusion of the other of the valve-chamber walls. Each of two valve members of magnetic material is guided by one to the exclusion of the other of the respective guide bores, and a poppet formation at the lower end of each valve member determines the open or closed condition of each valve, in coaction with its own valve seat and outlet passage, the latter being of magnetic material that is effectively part of the lowermost slab. The third slab provides a polarized, i.e., a permanently magnetized, connection of the guide bores to each other and, therefore, also of the valve members to each other. And an electromagnetic actuator includes a U-shaped core having spaced downward legs secured to the uppermost slab and providing separate pole faces which confront the upper ends of the valve members. A first polarized magnetic-latch circuit exists via the U-shaped core, the valve members and the third slab when the system is in valve-open condition. A second polarized magnetic-latch circuit exists via the first and third slabs and the valve members when the system is in valve-closed condition. And momentary electrical excitation of the electromagnet will shift the system from valve-open to valve-closed condition, or vice versa, depending upon the sign of the electrical excitation.

BRIEF DESCRIPTION OF THE DRAWINGS

A preferred embodiment of the invention will be described in detail in conjunction with the accompanying drawings, in which.

DETAILED DESCRIPTION

Figure 1:
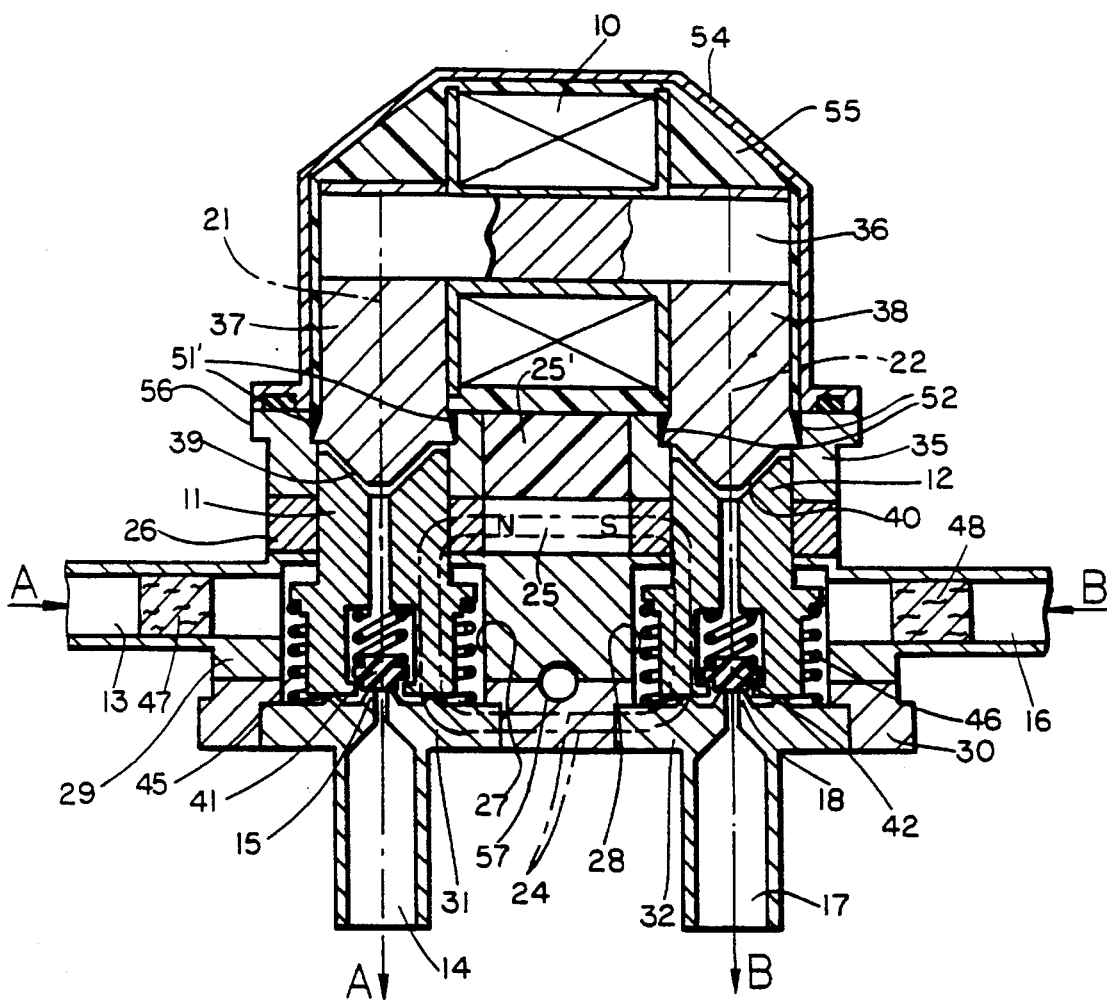
FIG. 1 is a vertical section taken in the geometric plane established by the axes of valve-member displaceability in the respective valves of a twin-valve system, the same being shown for the valve-closed state of both valves of the system.

In the foregoing and in the description which follows, the expressions "upper", "upward", "lower", and "downward" are used to simplify description for the orientation shown in the drawings, and it will be understood that the structure to be described can function in any orientation, i.e., without the gravitational context that might otherwise be suggested by such expressions. Also, the expressions "magnetic" and "magnetic material" will be understood to apply to the property of conducting magnetic flux, whereas the expressions "non-magnetic" and "non-magnetic material" will be understood to apply to a relative inability to conduct magnetic flux.

Figure 2:
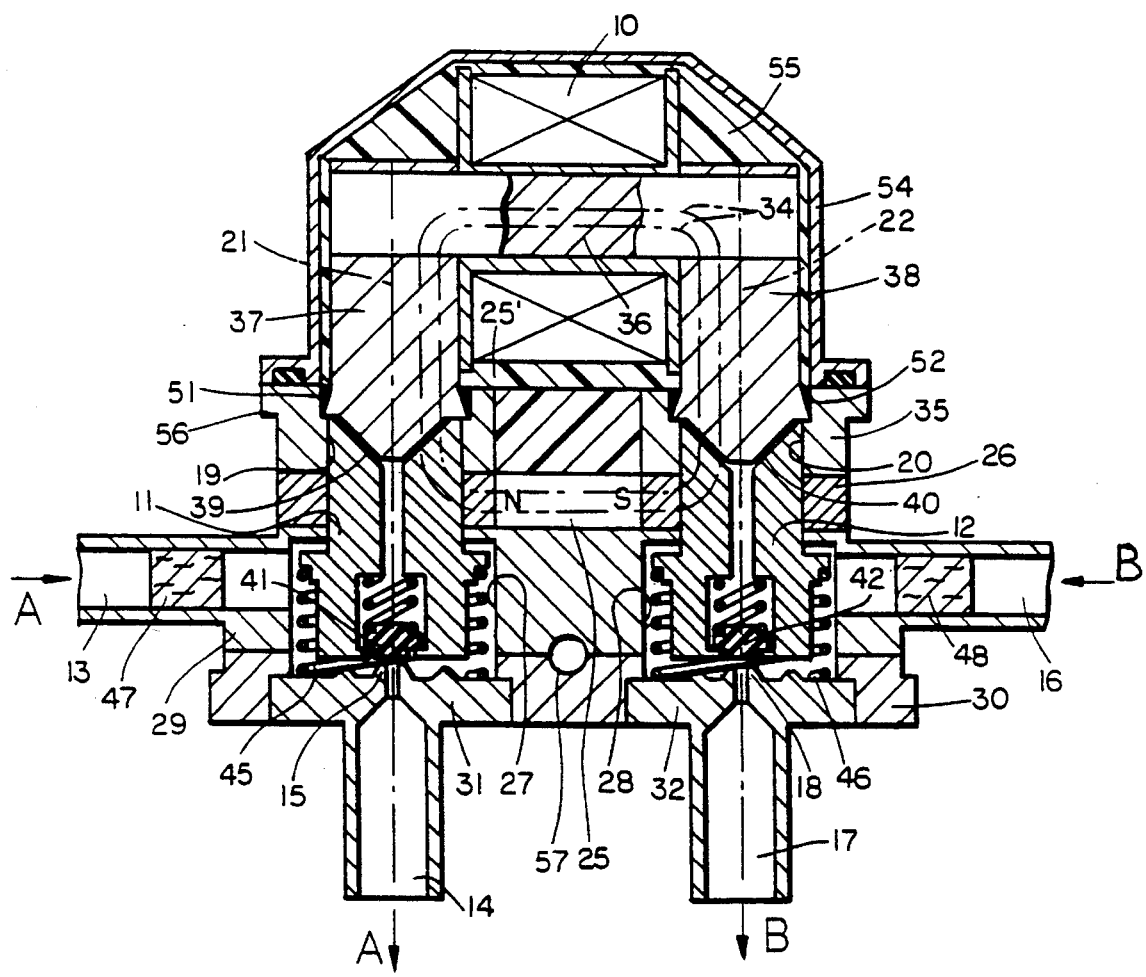
FIG. 2 is a view similar to FIG. 1, for the valve-open state of both valves of the system.

Referring initially to FIGS. 1 and 2, the invention is shown in application to an electromagnetically operated system, shown in its closed state, wherein a single electrical winding or solenoid 10 is excited with an electrical pulse of first polarity, to concurrently open two valves, by upwardly displacing their respective valve members 11, 12 (of magnetic material) from their downwardly latched, valve-closed position (FIG. 1) to their upwardly latched valve-open position (FIG. 2). Thereafter, an electrical pulse of opposite polarity is operative to downwardly displace both valve members from their upwardly latched valve-open position (FIG. 2) to their downwardly latched valve-closed position (FIG. 1).

When thus opened, a first pressure-fluid passage is established between an inlet 13 for first fluid flow A to an outlet 14, via a valve-seat formation 15; at the same time, a second pressure-fluid passage is also thus opened between an inlet 16 for a second fluid flow B to an outlet 17, via a valve-seat formation 18. The valve members 11, 12 are guided in bores 19, 20, for axial displaceability on axes 21, 22 which define an upstanding plane. These axes are shown to be parallel, but they may optionally be formed at opposite inclinations, for convergence in the downward direction; in copending application Ser. No. 08/104,722, filed Feb. 14, 1994, such convergence is shown and described as a useful feature when a multi-valve system is to serve flows of reacting ppropellant fluids (more commonly called propellants), such as nitrogen tetroxide (oxidizer) at A and monomethyl hydrazine (fuel) at B to the combustion chamber of a rocket engine (not shown), but fitted to receive the separate fluid-A and fluid-B discharges, as via outlets 14, 17.

In FIG. 1, a phantom double-line loop 24 schematically indicates the path of magnetic flux in a "down"-latching magnetic circuit, which relies upon a permanently polarized element 25 in a valve-body layer 26 of magnetic material, via which a first polarized magnetic circuit is completed to the magnetic material of both valve members 11, 12, thence downward in the valve members and through valve-chamber bores 27, 28 in a valve-body layer 29 of non-magnetic material, to circuit-completing interconnection of the lower ends of the valve members via a bottom valve body layer 30 of magnetic material. The bottom valve-body layer 30 of magnetic material extends across the full lateral extent of the sections of FIG. 1 and FIG. 2 and is shown to include like inserts 31, 32 of magnetic material seated in counterbores of layer 30 on the respective valve axes 21, 22; inserts 31 (32) close the lower end of the valve chambers 27 (28) and provide the valve-seat and outlet-passage formations already noted.

In similar fashion and referring to FIG. 2, a phantom double-line loop 34 schematically indicates the path of magnetic flux in an "up"-latching magnetic circuit which also relies upon the permanently polarized element 25 (and the valve-body layer 26 of magnetic material), via which a second polarized magnetic circuit continues to be completed to the magnetic material of both valve members 11, 12, thence upward in both valve members and through guide bores 19, 20 in an upper valve-body layer 35 of non-magnetic material. The U-shaped core of an electromagnet comprises a central element 36 to which winding 10 is coupled; the U-shaped core further comprises two downwardly extending legs 37, 38 which are secured to the non-magnetic layer 35 and which terminate in pole faces 39, 40 that are convex and frusto-conical about the respective axes 21, 22, and a flat relatively narrow annular stop surface surrounds the base end of this frusto-conical surface; each valve-member end which confronts one of these pole faces is concave and similarly frusto-conical, with a flat relatively narrow annular stop surface surrounding the geometric base of the concave frusto-conical surface. The relation between these stop surfaces and the convex and concave conical surfaces with which they are associated is such that, upon stop-to-stop engagement, relatively little pole-face contact area is involved, and the convex and concave surfaces are in at least a non-contacting, clearance relation.

In the form shown, each valve member 11 (12) is configured at its lower end to retain a poppet element 41 (42) in a normally seated "down" position against a shoulder in a bore at the bottom end of the valve member. This poppet element may be coated with or otherwise present a lower surface of elastomeric material, such as polytetrafluorethylene, for low-friction valve-closing coaction with its valve-seat 15 (18). Resilient means 43 (44) is shown continuously urging each of the popper elements 41 (42) in the direction of seating reference to its valve member, but the valve-seat formation 15 (18) is preferably so poised with respect to the shoulder-seated position of the poppet element 41 (42) in its valve member 11 (12), that closure of each valve by poppet engagement to its valve-seat formation occurs just prior to valve-member (11, 12) engagement with an annular stop formation 43 (44) of one of the closure elements 31 (32) of bottom layer 30.

Since popper relief from its shoulder-retained location in each valve member means at least some measure of valve-member overtravel for the valve-closed condition of the system, this overtravel must be added to the axial valve-member (i.e., popper) displacement required to open the valve; this can of course be handled by suitably elevated electric-pulse excitation of winding 10, but in the form shown a relatively stiff short-displacement spring 45 (46), is provided for reaction between each valve member 11 (12) and its valve-chamber closure 31 (32). Preferably, the stiffness coefficient of each spring 45 (46) is selected in relation to its unstressed overall length, such that zero or substantially zero spring force is applied to each valve member in its upper or valve-open position, but on the other hand a relatively stiffly compliant compressional spring force is developed in the course of displacement to the valve-closed position, thus making this compressional force available in instant aid of each valve-opening displacement.

Filtering means 47 (48) are schematically shown in the respective inlet passages 13, 16 for removal of any solid matter which might impair the fidelity of valve-open, valve-close action in response to electromagnetic actuation via winding 10. Valve-opening occurs when winding 10 is excited in the flux-inducing polarity which is in aid of the polarization established by element 25, all as further initially aided by the compressed spring force attributable to springs 45 (46). Valve-closing occurs when winding 10 is excited in opposition to the polarization established by element 25.

Figure 3:
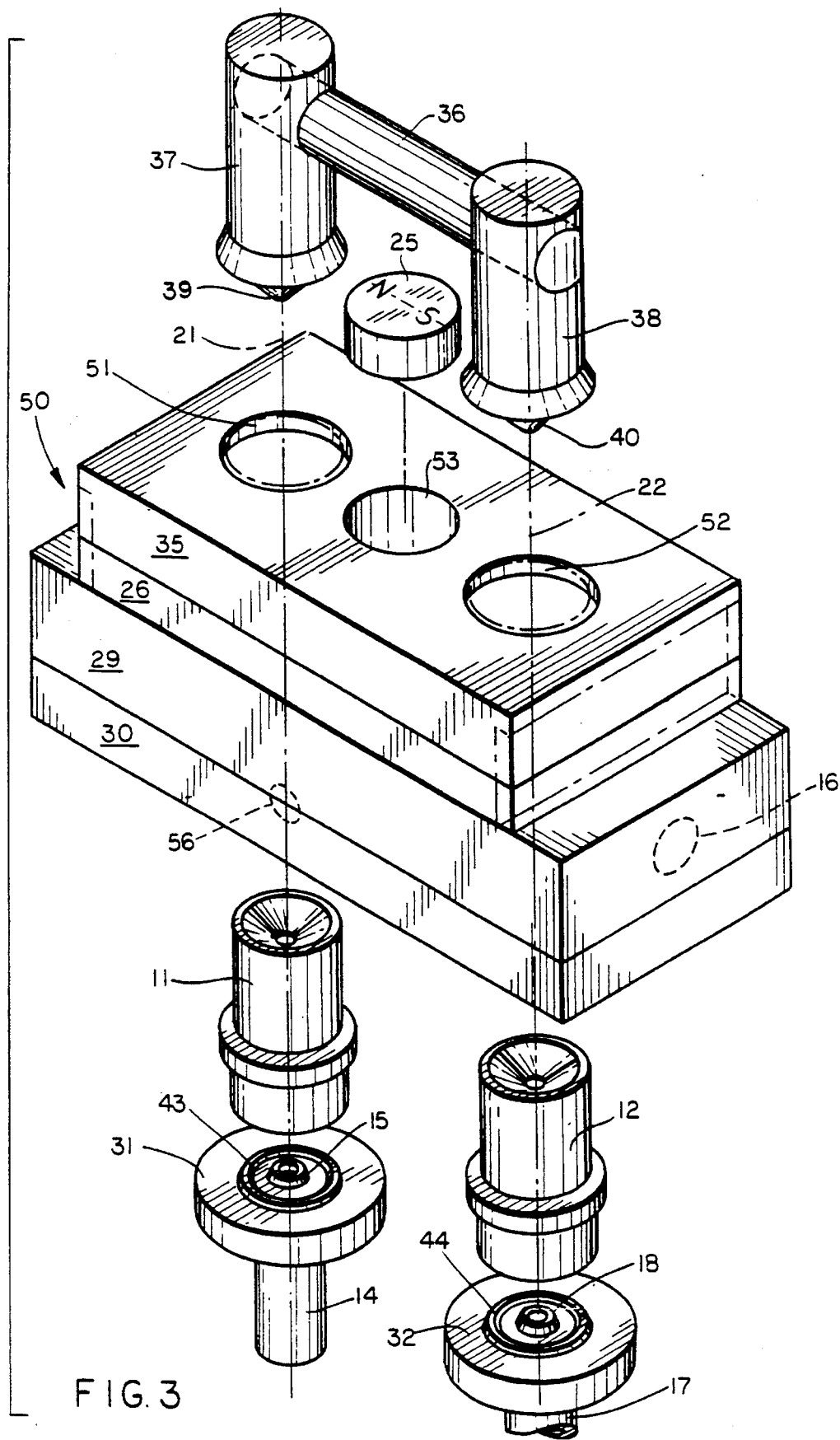
FIG. 3 is a simplified isometric diagram of valve-body structure in FIG. 1.

The construction and nature of valve-body structure, generally designated 50, is an important feature of the invention and will be discussed in further reference to FIG. 3 of the drawings.

The valve-body structure 50 is basically a prismatic block comprising four flat slabs which have already been designated, namely, a first and lowermost slab 30 of magnetic material to complete the lower leg of the latching circuit 24; a second and next-adjacent slab 29 of non-magnetic material, for accommodation of inlet passages 13, 16 and the valve chambers 27, 28 with which they respectively communicate; a third and next-adjacent slab 26 of magnetic material for establishing the permanently polarized connecting leg which is common to the latched valve-closure path 24 of FIG. 1 and to the latched valve-open path 34 of FIG. 2; and a fourth and uppermost slab 35 of non-magnetic material surrounding the respective regions of pole-face reaction with valve members 11, 12. These four slabs are bonded to each other in face-to-face relation prior to any machining of any of the bores or other features of the valve body. Thus, preferably, after the block 50 has been fully consolidated, boring operations can proceed through one or more slabs on axes 21, 22, to create features which have already been identified, namely: the walls of chambers 27, 28 (in slabs 30, 29) and the counterbores (in slab 30) for reception of closure inserts 31, 32; the valve-member guide bores in slabs 29, 26, 35, and counterbores 51, 52 in slab 35 for pole-face seating and welding to block 50; the side-ports in slab 29 for inlet passages 13, 16 to the respective chambers 27, 28; and a vertically downward central bore 53 (in slabs 35 and 26) between the guide bores, for insertional reception of the polarizing magnet 25 in the plane of magnetic slab 26, the same being shown fixed in place by a non-magnetic filler 25', as of epoxy resin.

As to bonding, a preference is indicated that these four slabs be initially characterized by relatively rough surface texture and that they be consolidated by the technique known as inertia-welding, wherein friction at slab-to-slab interfaces establishes a permanent fusion of the slabs to each other. Necessarily, for the described array of magnetic slabs in alternation with non-magnetic slabs, different adjacent metals will frictionally engage at each interface between successive slabs. The nature of inertia welding involving suitably different metals at each interface, is discussed in an undated booklet, "Inertia/Friction Welding-Application Principles", available from Interface Welding, Carson, Calif.

The most important machining operation is the formation of the two upwardly open bores 19, 20 which serve as valve-member guide bores in their passage through the third and fourth slabs 26, 35 and through the upper part of the second slab 29. On the same alignments (axes 21, 22), further boring defines the valve-chamber walls 27, 28 and the counterbores for seated reception of the magnetic valve-seat/outlet-passage fittings 32, 32. Tooling for such machining will depend upon hardness properties and tolerance specifications for the four slabs, and EDM machining is well suited to the purposes, including formation of the counterbores 51, 52 via which pole faces are fitted to upper slab 35, as by electron-beam welding, the same being suggested at 51', 52' in FIGS. 1 and 2.

It is preferred that, having performed the necessary boring operations on block 50, the electromagnetic components be next assembled to the bored block, with the indicated welding at 51', 52' of pole faces in counterbores 51, 52. Thereafter, the valve members 11, 12 and associated spring and poppet structure are inserted through the bottom of lower slab 30, and slab 30 is completed upon insertion and welding of fittings 31, 32 in their counterbores.

Upon thus-welded consolidation of pole-face connections to the counterbores 51, 52 of the non-magnetic upper slab 35, and welded consolidation of the magnetic fittings 31, 32 to the counterbores of the magnetic slab 30 (it being understood that winding 10 is incorporated in such consolidation of its core connections), the magnetic and electromagnetic components, as well as the fluid passages to be controlled thereby, are functionally complete. All that remains is to complete an enclosure of the electromagnetic means 10, 36, 37, 38. Such enclosure is shown in FIG. 1 as a cupped cover 54 having a grooved peripheral flange for sealed engagement to ledge means 55 of the body block 50, and this sealed engagement may be compressionally loaded, as by a peripheral succession of spaced bolts (not shown). Finally, a preference is indicated for potting all unused voids within the described structure, the same being suitably accomplished by a vacuum-induced epoxy filling 50. And, to assure against the remote possibility of fluid leakage through an insufficiently bonded slab-to-slab interface, a through-bore 56, open at both ends of the body block, intercepts the full extent of the interface between slabs 29, 30, thus exposing any such leakage to ambient atmosphere.

The described structure will be seen to meet all stated objectives. In particular, the described structure and the described method of manufacture offer important advantages, some of which are listed below:

1. The friction or inertia-welding method referred to above is preferred, for any rocket-engine applications of the invention. This preference is stated with respect to any other alternative slab-joining techniques, such as the use of "filler" or "brazing" material. This preferred method thus specifically avoids any possible incompatability of a filler material with valve effluent(s).

2. The two valve members 11, 12 operate with near-simultaneity, even though one of these members may start to move before the other, due, for example, to preload tolerances, or pressure differences, or gap differences at 28/29. The near-simultaneity of these actions is attributable to the "magnetically linked" relation of the valve members to the involved magnetic circuit, in that the force on the lagging member increases or decreases quickly in the direction to foster simultaneous displacement of both valve members.

What is claimed is:

1. A magnetically latched twin-valve system, comprising a body block of four relatively thick slabs vertically bonded to each other to the consolidated height of their combined thicknesses, the first and lowermost slab being of magnetic material, the second and next-adjacent slab being of non-magnetic material, the third and next-adjacent slab being of magnetic material, and the fourth and uppermost slab being of non-magnetic material, said second, third and fourth slabs being configured with two spaced upstanding and upwardly open guide bores on axes defining an upstanding vertical plane of symmetry, said first and second slabs being configured on each of said axes with a downwardly open valve-chamber wall of greater diameter than and communicating with one to the exclusion of the other of said guide bores, said second slab having an independent pressure-fluid inlet passage communicating with each of the respective valve-chamber walls, two valve members of magnetic material each of which has an upper cylindrical portion guided by one to the exclusion of the other of said guide bores, each of said valve members having a downwardly facing popper formation, separate outlet-port members of magnetic material fitted solely to said first slab to close the downwardly open valve-chamber wall at its lower end, each said outlet-port member in fitted position being configured with an upwardly facing valve-seat and a downwardly facing outlet passage on one to the exclusion of the other of said axes, said valve members being displaceable between a valve-open upper position and a valve-closed lower position of valve-seat engagement by said popper formation, means permanently and directionally magnetizing said third slab at least in the region between said axes and in a single direction from one to the other of said axes, and electromagnetic actuating means including a U-shaped core having spaced downward legs that present pole faces located in the guide bores of said fourth slab, said pole faces being in confronting relation with the upper cylindrical portion of each of said valve members.

2. The magnetically latched system of claim 1, in which axially compressible spring means coacting between each said valve member and its outlet-port member is compliantly compressed into a condition of upward valve-member bias when in its valve-closed lower position.

3. The magnetically latched system of claim 2, in which said axially compressible spring means is in a condition of substantially zero compression for the valve-open upper position of said valve members.

4. The magnetically latched system of claim 1, in which the popper formation of each of said valve members is an axially displaceable popper element resiliently urged to a normally seated position of valve-member retention when the valve member is in its valve-open upper position, said popper element being resiliently loaded to close said outlet passage when the valve member is in its lower position of valve-seat engagement.

5. The magnetically latched system of claim 4, in which axially compressible spring means coacting between each said valve member and its outlet-port member is compliantly compressed into a condition of upward valve-member bias when in its valve-closed lower position.

6. The magnetically latched system of claim 5, in which said axially compressible spring means is in a condition of substantially zero compression for the valve-open upper position of said valve members.

7. The magnetically latched system of claim 1, in which each inlet passage includes filtering means.

8. The magnetically latched system of claim 1, in which each of said spaced downward legs is secured to said uppermost slab.

9. The magnetically latched system of claim 8, in which said legs are welded to said uppermost slab.

10. The magnetically latched system of claim 1, in which said slabs are in inertia-welded bonded consolidation to each other.

11. The magnetically latched system of claim 1, in which said body block is further configured with a transversely extending through-passage open to external ambient atmosphere and (1) on an alignment transverse to said plane of symmetry and (2) continuously exposed to the bonded adjacent surfaces of said bonded first and second slabs and (3) intermediate said valve-chamber walls.

12. The magnetically latched system of claim 1, in which each of said pole faces is of convex frusto-conical configuration centered on one to the exclusion of the other of said axes, and in which each of said upper cylindrical valve-member portions is configured with a concave frusto-conical formation for convex pole-face coaction.

13. The magnetically latched valve system of claim in which the geometric base of each said convex frusto-conical configuration has a radially outward annular shoulder, and in which the geometric base of the concave frusto-conical formation of each of said upper cylindrical valve-member portions is further configured with a radially outward annular stop, the relation of said convex and concave formations to each other and to said stop and shoulder formations being such that said stop and shoulder formations abut to retain said frusto-conical formations in at least some clearance relation when said valve members are in valve-open upper position.

14. The magnetically latched valve system of claim 1, in which said third and fourth slabs are further configured with another upwardly open vertical bore having an axis in said plane of symmetry and intermediate said guide bores, said permanently and directionally magnetizing means being a separate element in said bore intermediate said guide bores.

15. The magnetically latched valve system of claim 14, in which said separate polarizing element is a cylindrical element which is directionally polarized in a diametric plane.

16. A magnetically latched valve system, comprising a generally rectangular magnetic circuit having like laterally spaced longitudinal legs, first-end-connection structure including a core element and a single excitation winding means inductively coupled to said core element, second end-connection structure retained by non-magnetic means such that a longitudinal gap is defined in each of said legs, said second end-connection structure including an outlet-formation in alignment with each of said legs, said non-magnetic means defining mutually independent valve-body cavities at each of said gaps, said non-magnetic means providing independent valve-body cavities at each of said gaps, said non-magnetic means providing an independent lateral inlet port to each of said cavities, a valve member of magnetic flux-conducting material in each of said gaps and guided for a range of longitudinal displaceability between a valve-open position of leg contact and a valve-closed position of outlet-port contact, and permanently polarized magnet means extending laterally between and magnetically connecting said valve members to each other throughout said range of displaceability; whereby when said winding is transiently excited in directional opposition to said permanently polarized means, said valve members are driven to and latched in their respective valve-closed positions, and when said winding is transiently excited in directional coincidence with said permanently polarized means, said valve members are driven to and latched in their respective valve-open positions.

17. The magnetically latched valve system of claim 16, in which each outlet formation includes an annular valve seat, and in which each valve member includes a resiliently yieldable popper element having valve-seat engagement when in valve-closed position.

18. The magnetically latched valve system of claim 16, in which axially compressible spring means reacting between each said valve member and its outlet formation is compliantly compressed into a condition of valve-member bias in the valve-opening direction when in its valve-closed position.

19. The magnetically latched valve system of claim 18, in which said axially compressible spring means is in a condition of substantially zero compression for the valve-open position of said valve members.

20. A magnetically latched twin-valve system, comprising a generally rectangular magnetic circuit having laterally spaced legs, first end structure including a core element and a single excitation winding means inductively coupled to said core element; each of said legs comprising a fixed portion connected to said first end structure and exposing a pole face facing away from said core element, and each of said legs further comprising a valve-member portion configured for longitudinal magnetic-force reaction with and axially guided displaceability with respect to said pole face; non-magnetic structural means fixed to the fixed portion of each of said legs and configured to define a longitudinal guide for each said valve-member portion; said magnetic circuit further comprising second end structure fixed to said non-magnetic means at such longitudinal offset from said pole faces as to establish a limited range of longitudinal displaceability of said valve-member portions between a pole-face contacting position and a position of contacting said second end structure; said non-magnetic structural means defining (1) a separate valve-body cavity within which one to the exclusion of the other of said valve-member portions is movable from one to the other of said positions, and (2) a separate first-port connection to each separate cavity; and said second end structure defining a separate second-port connection to each separate cavity, each said second-port connection being closed when said valve-member portions are in said position of contacting said second end structure; and permanently polarized magnet means extending laterally between and magnetically connecting said valve members to each other throughout said range of displaceability.

* * * * *